(12) United States Patent
Binek et al.

(10) Patent No.: US 10,954,810 B2
(45) Date of Patent: Mar. 23, 2021

(54) ADDITIVE MANUFACTURED INTEGRATED RUB-STRIP FOR ATTRITABLE ENGINE APPLICATIONS

(71) Applicant: United Technologies Corporation, Farmington, CT (US)

(72) Inventors: Lawrence Binek, Glastonbury, CT (US); Matthew B. Kennedy, Vernon, CT (US); Evan Butcher, Suffield, CT (US); Jesse R. Boyer, Middletown, CT (US); Vijay Narayan Jagdale, South Windsor, CT (US); Dmytro Mykolayovych Voytovych, Rocky Hill, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 60 days.

(21) Appl. No.: 16/221,911

(22) Filed: Dec. 17, 2018

(65) Prior Publication Data
US 2020/0191008 A1    Jun. 18, 2020

(51) Int. Cl.
*F01D 11/12*      (2006.01)
*B33Y 80/00*      (2015.01)

(52) U.S. Cl.
CPC .......... *F01D 11/122* (2013.01); *F01D 11/127* (2013.01); *B33Y 80/00* (2014.12); *F05D 2230/30* (2013.01); *F05D 2250/283* (2013.01); *Y02T 50/60* (2013.01)

(58) Field of Classification Search
CPC .............................. F01D 11/122; F01D 11/127
See application file for complete search history.

(56) References Cited

U.S. PATENT DOCUMENTS

| 7,029,232 | B2 * | 4/2006 | Tuffs | F01D 11/127 |
| | | | | 415/173.1 |
| 8,192,792 | B2 | 6/2012 | Haynes et al. | |
| 8,939,707 | B1 * | 1/2015 | Lee | F01D 11/122 |
| | | | | 415/1 |
| 9,816,388 | B1 * | 11/2017 | Kirtley | F16J 15/447 |
| 9,903,217 | B2 | 2/2018 | Allen et al. | |
| 10,369,630 | B2 * | 8/2019 | Kottilingam | B33Y 10/00 |
| 2004/0265120 | A1 | 12/2004 | Tuffs et al. | |

(Continued)

FOREIGN PATENT DOCUMENTS

| DE | 102010062087 A1 * | 5/2012 | ........... B29C 64/153 |
| EP | 2687684 A1 * | 1/2014 | ........... F01D 11/122 |

OTHER PUBLICATIONS

Colombi, J. "Attritable design trades: Reliability and cost implications for unmanned aircraft" Apr. 2017. DOI: 10.1109/SYSCON.2017.7934767 (Year: 2017).*

(Continued)

*Primary Examiner* — Eldon T Brockman
*Assistant Examiner* — Topaz L. Elliott
(74) *Attorney, Agent, or Firm* — Bachman & LaPointe, P.C.

(57) ABSTRACT

A unitary rub strip comprises a casing having an inner surface and an outer surface opposite the inner surface; a unitary rub strip is formed integral with the casing proximate the inner surface, wherein the unitary rub strip comprises a modified structure within the casing configured to abrade responsive to an interaction with a rotating element.

14 Claims, 3 Drawing Sheets

(56) References Cited

U.S. PATENT DOCUMENTS

| | | | | |
|---|---|---|---|---|
| 2014/0341731 | A1* | 11/2014 | Scott | F01D 11/003 |
| | | | | 415/214.1 |
| 2016/0230582 | A1* | 8/2016 | Schlothauer | F01D 11/127 |
| 2016/0319690 | A1 | 11/2016 | Lin et al. | |
| 2017/0051625 | A1* | 2/2017 | Slavens | F01D 11/18 |
| 2017/0089213 | A1* | 3/2017 | Stevens | B22F 3/1055 |
| 2017/0175560 | A1* | 6/2017 | Merrill | F01D 5/187 |
| 2017/0335708 | A1* | 11/2017 | Kray | F01D 11/08 |
| 2018/0050392 | A1 | 2/2018 | Mason-Flucke et al. | |
| 2018/0087669 | A1 | 3/2018 | Saha et al. | |
| 2018/0243830 | A1* | 8/2018 | Kottilingam | F01D 11/127 |
| 2019/0010820 | A1* | 1/2019 | Scherer | F01D 11/122 |
| 2019/0093513 | A1* | 3/2019 | Jung | F01D 25/162 |
| 2019/0368381 | A1* | 12/2019 | Greenwood | F01D 25/246 |
| 2020/0003309 | A1* | 1/2020 | Bamberg | F04D 29/665 |

OTHER PUBLICATIONS

European Search Report dated Apr. 22, 2020 issued for corresponding European Patent Application No. 19217141.1.

* cited by examiner

ADDITIVE MANUFACTURED INTEGRATED RUB-STRIP FOR ATTRITABLE ENGINE APPLICATIONS

BACKGROUND

The present disclosure is directed to an integrated rub-strip for attritable engine applications.

Attritable or expendable propulsion systems have a short lifespan relative to typical flight applications. The attritable engine is utilized for a limited lifespan and disposed. The attritable gas turbine engine may not even be operated through a full operational cycle. The attritable gas turbine engine may only perform start-up, and operational load before being decommissioned.

Since the operational modes of the attritable gas turbine engine may be significantly less than the conventional gas turbine engine, the attritable engine does not need to meet the same durability or safety requirements as the conventional gas turbine engine. Conventional gas turbine engine manufacturing techniques deployed for attritable engines can be more costly and more complex than needed. Since conventional manufacturing techniques can be more costly, additive manufacturing techniques may be deployed in substitute to reduce cost and complexity of the attritable gas turbine engine.

Rub-strips are used to ensure a specific clearance between a rotating assembly and casing/housing. Conventionally, a material is applied to the casing in a form of treatment. The rub strip material is abraded by the rotating blade tips during operation. Installation of a rub strip can be labor intensive as well as creating additional part count for the attritable turbine engine.

What is needed is a rub strip that can reduce part count for attritable engine systems and thus reduce cost.

SUMMARY

In accordance with the present disclosure, there is provided a unitary rub strip comprising a casing having an inner surface and an outer surface opposite the inner surface a unitary rub strip formed unitary with the casing proximate the inner surface, wherein the unitary rub strip comprises a modified structure within the casing configured to abrade responsive to an interaction with a rotating element.

In another and alternative embodiment, the modified structure comprises a plurality of spars.

In another and alternative embodiment, the plurality of spars are angled relative to the inner surface.

In another and alternative embodiment, the spars are aligned with a rotary direction of travel of the rotating element.

In another and alternative embodiment, the modified structure comprises a honeycomb, a curvature, a corkscrew shape, herring bone shape, chevron shape, and crescent shape.

In another and alternative embodiment, the modified structure comprises a keyhole structure configured to abrade.

In another and alternative embodiment, the strip comprises the same material composition as the casing.

In accordance with the present disclosure, there is provided a casing with unitary rub strip for an attritable gas turbine engine comprising a rotor defining a path of rotation about an axis of the gas turbine engine; the casing having a body comprising an exterior portion and an interior portion opposite the exterior portion, wherein the interior portion radially extends into the path of rotation; and the unitary rub strip being formed from the casing at the interior portion.

In another and alternative embodiment, the unitary rub strip comprises a keyhole structure formed into the casing interior portion configured to abrade responsive to an interaction with the rotor.

In another and alternative embodiment, the keyhole structure comprises a plurality of spars.

In another and alternative embodiment, the keyhole structure is selected from the group consisting of voids, gaps, fissures, hollows, trenches, and honeycomb.

In another and alternative embodiment, the unitary rub strip comprises the same material composition as the casing.

In another and alternative embodiment, the keyhole structure is configured to elastically deform responsive to contact with the rotor.

In accordance with the present disclosure, there is provided a process for forming a casing with unitary rub strip comprising forming a casing having an inner surface and an outer surface opposite the inner surface; forming a unitary rub strip integral with the casing proximate the inner surface, wherein the unitary rub strip comprises a modified structure within the casing configured to abrade responsive to an interaction with a rotating element.

In another and alternative embodiment, the unitary rub strip comprises model-based additive manufacturing techniques.

In another and alternative embodiment, the unitary rub strip comprises changing process parameters to produce the modified structure within the casing proximate the inner surface.

In another and alternative embodiment, the process further comprises setting a scan strategy for forming the modified structure.

In another and alternative embodiment, the unitary rub strip comprises the same material composition as the casing.

In another and alternative embodiment, the modified structure comprises forming at least one keyhole structure into the casing proximate the inner surface configured to abrade responsive to an interaction with a rotor.

There is an opportunity to leverage additive manufacturing (AM) techniques to improve various aspects of these limited-life products' lifecycles. These aspects include unitizing assembly details, integration of complex performance-enhancing features, lowering production costs, and reducing time to delivery; typically prohibitive when leveraging conventional manufacturing techniques.

Using additive manufacturing, the rub strip is integrated into the inner wall of the casing. The features of the rub strip section would be extremely fine to assist in the abrasion operation of the rotating section. The rub strip features would be composed of the same material as the casing to which they originate.

Other details of the integrated rub-strip are set forth in the following detailed description and the accompanying drawings wherein like reference numerals depict like elements.

DETAILED DESCRIPTION

Figure 1:
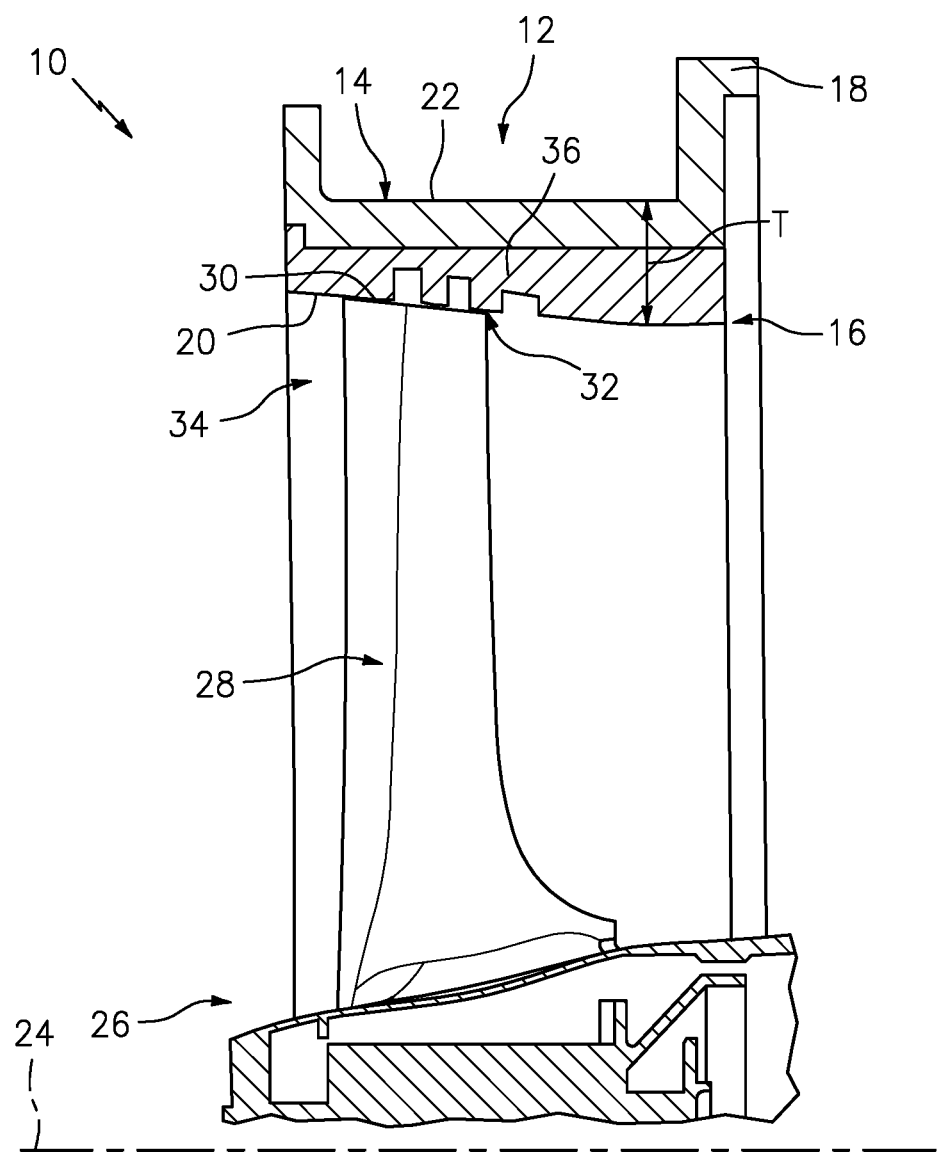
FIG. 1 a cross-sectional schematic representation of a section of a turbine engine with a rotating element.
Figure 2:
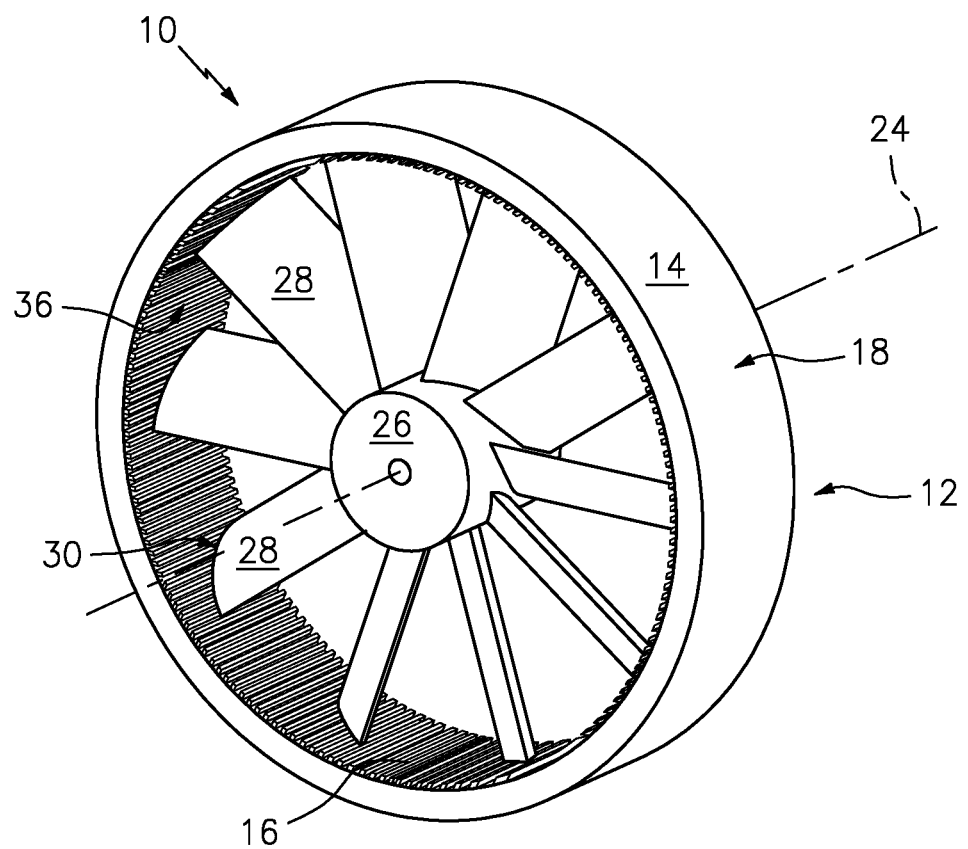
FIG. 2 is an isometric view of a schematic representation of a section of a turbine engine with a rotating element.

Referring now to FIG. 1 and FIG. 2, there is illustrated a section of a gas turbine engine 10, such as a compressor section or turbine section. The turbine engine section 10 can include a casing 12. The casing 12 includes a body 14 that includes an interior portion 16 opposite an exterior portion 18. The interior portion 16 has an inner surface 20 that is opposite an outer surface 22 formed in the exterior portion 18. The interior portion 16 extends from the body 14 axially toward a central axis 24 of the turbine engine section 10. In an exemplary embodiment, the body 14 has a thickness T that spans from the outer surface 22 to the inner surface 20.

A rotating element or simply rotor 26 is shown inside the casing 12. The rotor 26 has an airfoil portion 28 with a tip 30 opposite the central axis 24. The tip 30 of the rotor 26 is configured to interact with the inner surface 20 of the casing to form an air seal 32 that functions to inhibit the flow of the working fluid between the tip 30 and inner surface 20.

The interior portion 16 of the casing 12 can extend into a path of rotation 34 of the rotor 26. The path of rotation 34 is circular and revolves about the central axis of rotation 24. The circular path that the rotor 26 sweeps through upon rotation about the central axis 24 defines the path of rotation 34. The path of rotation 34 can intersect with and/or go beyond the inner surface 20. In such cases when the path of rotation 34 goes beyond the inner surface 20, an interaction between the tip 30 of the rotor 26 and the interior portion 16 takes place. The tip 30 can rub and/or cut into the inner surface 20.

In order to properly react to the interaction between the tip 30 and the interior portion 16, a unitary rub strip 36 is formed as part of the interior portion 16 proximate the inner surface 20. The unitary rub strip 36 forms a part of the air seal 32 with the tip 30. The unitary rub strip 36 is configured to abrade responsive to the interaction of the rotor tip 30 and the interior portion 16 of the casing 12. The rub strip 36 is configured to shear away, elastically deform and yield to the harder material of the tip 30 as the tip sweeps through the rub strip 36.

Figure 3:
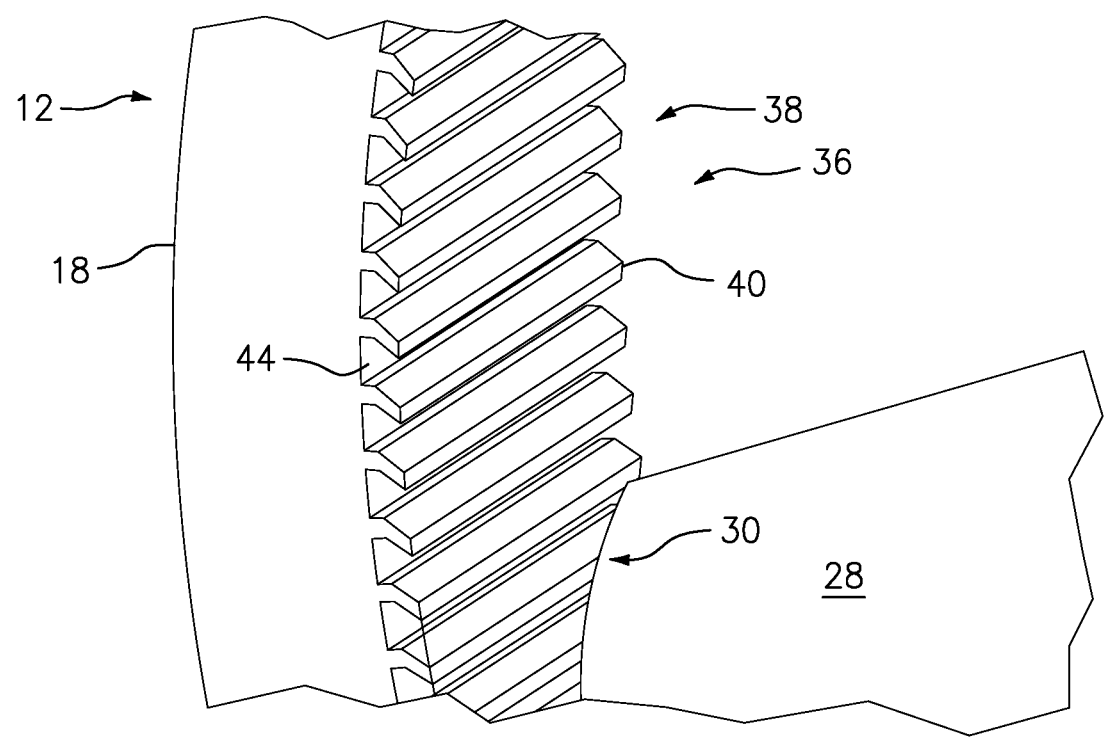
FIG. 3 an enlarged view of a portion of an exemplary integral rub strip of the turbine engine with a rotating element of FIG. 2.
Figure 4:
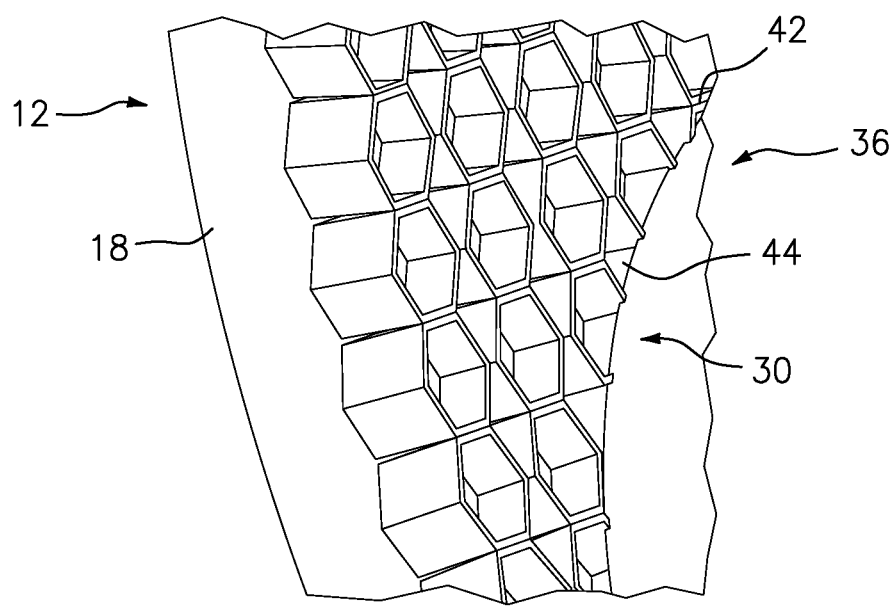
FIG. 4 an enlarged view of a portion of an exemplary integral rub strip of the turbine engine with a rotating element of FIG. 1.

Referring also to FIGS. 3 and 4, the unitary rub strip 36 is made from the same material composition as the casing 12. In an alternative embodiment, the unitary rub stripe can have a different material composition from the casing 12. The unitary rub strip 36 is a modified structure 38 of the casing 12. The unitary rub strip 36 is formed from the casing 12 at the interior portion 16 and can include the inner surface 20. The modified structure 38 of the casing material 12 can include a plurality of spars 40 that extend radially toward the central axis 24. In an exemplary embodiment, the plurality of spars 40 are angled relative to the inner surface 20, so as to improve the interaction between the unitary rub strip 36 and the rotor 26. The spars 40 can be aligned with a rotary direction of travel of the rotating rotor 26. In an exemplary embodiment, the modified structure includes a honeycomb 42 design. It is contemplated that the modified structure 38 can include a variety of keyhole structures 44 that are modifications to the casing 12 material at the interior portion 16 near the inner surface 20, such that the tip 30 can abrade the unitary rub strip 36 upon an interaction. The keyhole structures 44 can be porous, voids, gaps, fissure, hollow, trench, pocket and the like.

In another and alternative embodiment, the modified structure 38 can include dimples, ridges, nubs, lumps, protuberances, furrows, voids, gaps, fissures, hollows, trenches, pockets, bumps, lumps, knobs, projections, protrusions, prominences, outcrops, outgrowths, juts, jags, and snags. In another exemplary embodiment, the modified structure 38 can be formed to reduce the surface area of contact with the tip 30. The modified structure 38 can be configured to provide an aerodynamic benefit, reduce tangential flow blockage and aid in the brush by of the tip 30. The modified structure 38 can include spars 40 with a curvature along the axial length, such as corkscrew shape, herring bone shape, chevron shape, crescent shape similar to the shape of the airfoil portion 28 and the like. The modified structure 38 can include an angle of entry and exit angle that helps to enable the aerodynamic characteristics for the working fluid.

The unitary rub strip 36 can be formed along with the casing 12 by use of additive manufacturing. In an exemplary embodiment, the unitary rub strip can be formed utilizing model-based additive manufacturing techniques. Those exemplary additive manufacturing techniques can include changing process parameters to produce the modified structure 38 within the casing 12 proximate the inner surface 20. The exemplary additive manufacturing techniques can include setting a scan strategy for forming the modified structure 38 of the casing interior portion 16.

The unitary rub strip provides the advantage of lower part count.

The unitary rub strip provides the advantage of reduced assembly time.

The unitary rub strip provides the advantage of lower weight and more simplified attritable turbine engine design.

The unitary rub strip provides the advantage of eliminating the need to design replaceable rub strips.

Since the turbine engine is attritable, that is, disposable, there is no need for a complex rub strip design that takes into account the thermal cycling of the full turbine engine operating cycle.

There has been provided an integrated rub-strip. While the integrated rub-strip has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A unitary rub strip for an attritable gas turbine engine casing comprising:
   an attritable gas turbine engine outermost casing having an inner surface and an outer surface opposite said inner surface
   a structure formed unitary with said casing proximate said inner surface, wherein said structure within said casing is configured to abrade responsive to an interaction with a rotating element; wherein said structure comprises a plurality of spars, and wherein said casing is cylindrical and said spars are bent or angled, along the radial direction, toward the circumferential direction.

2. The unitary rub strip according to claim 1, wherein said plurality of spars are angled relative to said inner surface.

3. The unitary rub strip according to claim 1, wherein said unitary rub strip comprises a different material composition from said casing.

4. The unitary rub strip according to claim 1, wherein said unitary rub strip comprises the same material composition as said casing.

5. An outermost casing with unitary rub strip for an attritable gas turbine engine having a rotor defining a path of rotation about an axis of the gas turbine engine, the outermost casing comprising:

a body comprising an exterior portion and an interior portion opposite said exterior portion, wherein said interior portion radially extends into said path of rotation, said exterior portion comprising the exterior of the gas turbine engine; and the unitary rub strip being formed from said casing at said interior portion, wherein said unitary rub strip comprises a keyhole structure within said casing configured to abrade responsive to an interaction with a rotating element; wherein said keyhole structure comprises a plurality of spars, and wherein said casing is cylindrical and said spars are bent or angled, along the radial direction, toward the circumferential direction.

6. The casing with unitary rub strip according to claim 5, wherein said keyhole structure further comprises at least one structure selected from the group consisting of voids, gaps, fissures, hollows, trenches, and honeycomb.

7. The casing with unitary rub strip according to claim 5, wherein said unitary rub strip comprises the same material composition as said casing.

8. The casing with unitary rub strip according to claim 5, wherein said keyhole structure is configured to elastically deform responsive to contact with said rotor.

9. A process for forming an attritable gas turbine engine outermost casing with unitary rub strip comprising:

forming the outermost casing having an inner surface and an outer surface opposite said inner surface, said outer surface being the exterior of the gas turbine engine;

forming the unitary rub strip integral with said casing proximate said inner surface, wherein said unitary rub strip comprises a structure within said casing configured to abrade responsive to an interaction with a rotating element, wherein said structure comprises a plurality of spars, and wherein said casing is cylindrical and said spars are bent or angled, along the radial direction, toward the circumferential direction.

10. The process of claim 9, wherein forming said casing and said unitary rub strip comprises model-based additive manufacturing techniques.

11. The process of claim 9, wherein forming said unitary rub strip comprises changing process parameters to produce said structure within said casing proximate said inner surface.

12. The process of claim 11, further comprising:
setting a scan strategy for forming said structure.

13. The process of claim 9, wherein said unitary rub strip comprises the same material composition as said casing.

14. The process of claim 9, wherein said structure further comprises a honeycomb.

* * * * *